United States Patent
Furubayashi et al.

(10) Patent No.: US 12,434,417 B2
(45) Date of Patent: *Oct. 7, 2025

(54) RUBBER EXTRUSION DEVICE AND METHOD FOR MANUFACTURING RUBBER EXTRUDATE

(71) Applicant: The Yokohama Rubber Co., LTD., Tokyo (JP)

(72) Inventors: Yuki Furubayashi, Shinshiro (JP); Satoru Nishio, Shinshiro (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 782 days.

This patent is subject to a terminal disclaimer.

(21) Appl. No.: 16/486,746

(22) PCT Filed: Dec. 25, 2017

(86) PCT No.: PCT/JP2017/046319
§ 371 (c)(1),
(2) Date: Aug. 16, 2019

(87) PCT Pub. No.: WO2018/150733
PCT Pub. Date: Aug. 23, 2018

(65) Prior Publication Data
US 2019/0358881 A1    Nov. 28, 2019

(30) Foreign Application Priority Data

Feb. 16, 2017  (JP) ................................. 2017-026510

(51) Int. Cl.
*B29C 48/12*    (2019.01)
*B29C 48/07*    (2019.01)
(Continued)

(52) U.S. Cl.
CPC .............. *B29C 48/12* (2019.02); *B29C 48/07* (2019.02); *B29C 48/31* (2019.02); *B29C 48/88* (2019.02);
(Continued)

(58) Field of Classification Search
CPC ....... B29C 48/07; B29C 48/12; B29C 48/302; B29C 48/31; B29C 48/92;
(Continued)

(56) References Cited

U.S. PATENT DOCUMENTS

| 293,804 | A | * | 2/1884 | Smith | ................... | B29C 48/313 |
| | | | | | | 425/466 |
| 2,141,005 | A | * | 12/1938 | Lussie | .................... | B29C 48/09 |
| | | | | | | 425/464 |

(Continued)

FOREIGN PATENT DOCUMENTS

| EP | 1 211 049 | 6/2002 |
| JP | S50-020593 | 7/1975 |

(Continued)

OTHER PUBLICATIONS

English translation of JP 2014-172250, Sep. 22, 2014. (Year: 2014).*

(Continued)

*Primary Examiner* — Xiao S Zhao
*Assistant Examiner* — Joseph S Leyson
(74) *Attorney, Agent, or Firm* — Thorpe North & Western

(57) ABSTRACT

A die attached to a head of a rubber extrusion device is disposed at a leading end position of an extrusion flow path. The die is moved at least in a uniaxial direction relative to the head along a leading end surface of the head to place the die and the head in a desired relative position. A rubber material is extruded forward using a screw installed inside a cylinder, while being mixed and kneaded. Resultant unvul- (Continued)

canized rubber is fed into an extrusion flow path and extruded from an extrusion port formed in the die.

12 Claims, 8 Drawing Sheets

(51) Int. Cl.
  *B29C 48/31* (2019.01)
  *B29C 48/88* (2019.01)
  *B29C 48/92* (2019.01)
(52) U.S. Cl.
  CPC ...... *B29C 48/92* (2019.02); *B29C 2948/9258* (2019.02); *B29C 2948/92704* (2019.02); *B29C 2948/92885* (2019.02); *B29C 2948/92904* (2019.02)
(58) Field of Classification Search
  CPC ........... B29C 2948/92076; B29C 2948/92171; B29C 2948/92409; B29C 2948/92571; B29C 2948/92666; B29C 2948/92904
  See application file for complete search history.

(56) References Cited

U.S. PATENT DOCUMENTS

| | | | | |
|---|---|---|---|---|
| 3,215,094 | A | * | 11/1965 | Oldershaw .............. A23P 30/20 426/512 |
| 3,647,330 | A | * | 3/1972 | Hann ...................... B29C 48/14 425/76 |
| 3,830,610 | A | | 8/1974 | Ohkawa et al. |
| 6,491,510 | B1 | | 12/2002 | Tieu et al. |
| 11,396,120 | B2 | * | 7/2022 | Nishio .................... B29C 48/31 |
| 2002/0063357 | A1 | | 5/2002 | Ohki |
| 2013/0221557 | A1 | * | 8/2013 | Yonesato ................ B29C 48/87 264/40.6 |
| 2013/0334722 | A1 | | 12/2013 | Kitamura et al. |
| 2016/0361857 | A1 | * | 12/2016 | Reineke .................. B29C 48/09 |

FOREIGN PATENT DOCUMENTS

| | | |
|---|---|---|
| JP | S58-220717 | 12/1983 |
| JP | H03-143609 | 6/1991 |
| JP | 2002-103421 | 4/2002 |
| JP | 2004-243732 | 9/2004 |
| JP | 2008-126560 | 6/2008 |
| JP | 2009-061691 | 3/2009 |
| JP | 2011-194854 | 10/2011 |
| JP | 2012-091340 | 5/2012 |
| JP | 2013-216069 | 10/2013 |
| JP | 2014-172250 | 9/2014 |
| RO | 126104 | 3/2011 |

OTHER PUBLICATIONS

International Search Report for International Application No. PCT/JP2017/046319 dated Jan. 30, 2018, 4 pages, Japan.

* cited by examiner

RUBBER EXTRUSION DEVICE AND METHOD FOR MANUFACTURING RUBBER EXTRUDATE

TECHNICAL FIELD

The present technology relates to a rubber extrusion device and a method for manufacturing a rubber extrudate and particularly relates to a rubber extrusion device capable of suppressing unintended curving of a rubber extrudate and a method for manufacturing a rubber extrudate.

BACKGROUND ART

In a case where a rubber product such as a tire is manufactured, an extrusion step is available in which unvulcanized rubber is extruded by a rubber extrusion device. A screw installed inside an rubber extrusion device plasticizes unvulcanized rubber and feeds plasticized unvulcanized rubber into an extrusion flow path formed in a head of the leading end. A die including an extrusion port with a desired shape is installed at the leading end of the head, and unvulcanized rubber passes through the extrusion port. A rubber extrudate provided with the desired shape is thus manufactured (see, for example, Japan Unexamined Patent Publication Nos. 2008-126560 and 2013-216069).

Different types of rubber have different rubber physical properties, and even for the same type of rubber, rubber physical properties vary among lots to some degree. In addition, extrusion conditions and the like vary among lots. Due to these variations, even in a case where the unvulcanized rubber is extruded using the same die, the rubber extrudate may be curved in an unintended direction with respect to the extrusion direction, preventing rubber extrudates with the desired shape from being obtained. In each case of such unintended curving, excess working man-hours are required in order to modify the back side shape of the die by machining or adjust extrusion conditions or the like.

SUMMARY

The present technology provides a rubber extrusion device capable of suppressing unintended curving of a rubber extrudate and a method for manufacturing a rubber extrudate.

A rubber extrusion device of an embodiment of the present technology includes a cylindrical cylinder, a screw disposed in an internal space of the cylinder, a head installed at a leading end of the cylinder and including an extrusion flow path communicating with the internal space, and a die attached to the head at a leading end position of the extrusion flow path, the die including an extrusion port, wherein the rubber extrusion device includes a moving unit moving the die at least in a uniaxial direction relative to the head along a leading end surface of the head, and is capable of fixing the die and the head in a desired relative position.

A method for manufacturing a rubber extrudate according to an embodiment of the present technology includes feeding a rubber material into an internal space of a cylindrical cylinder, extruding the rubber material forward using a screw disposed in the internal space, while mixing and kneading the rubber material, feeding resultant unvulcanized rubber into an extrusion flow path formed in a head located at a leading end of the cylinder, and extruding the unvulcanized rubber from an extrusion port as a rubber extrudate, the extrusion port being formed in a die attached to the head at a leading end of the extrusion flow path, wherein the method includes placing the die and the head in a desired relative position by moving the die at least in a uniaxial direction relative to the head along a leading end surface of the head, and extruding the unvulcanized rubber such that the unvulcanized rubber passes through the extrusion flow path and exits though the extrusion port, reducing an amount of curving with respect to an extrusion direction of the rubber extrudate.

According to the present technology, the die can be moved at least in the uniaxial direction relative to the head along the leading end surface of the head. In a case where the extrusion port is moved in a direction orthogonal to the extrusion direction relative to the extrusion flow path, a change occurs in a pressure distribution (fluid flow distribution) of the unvulcanized rubber passing through the extrusion flow path and then through the extrusion port. This allows the manner of curving of the rubber extrudate to be adjusted. Thus, by moving the die relative to the head along the leading end surface of the head such that the rubber extrudate is curved in a direction opposite to the direction of unintended curving, the unintended curving of the rubber extrudate can be suppressed.

DETAILED DESCRIPTION

Figure 1:
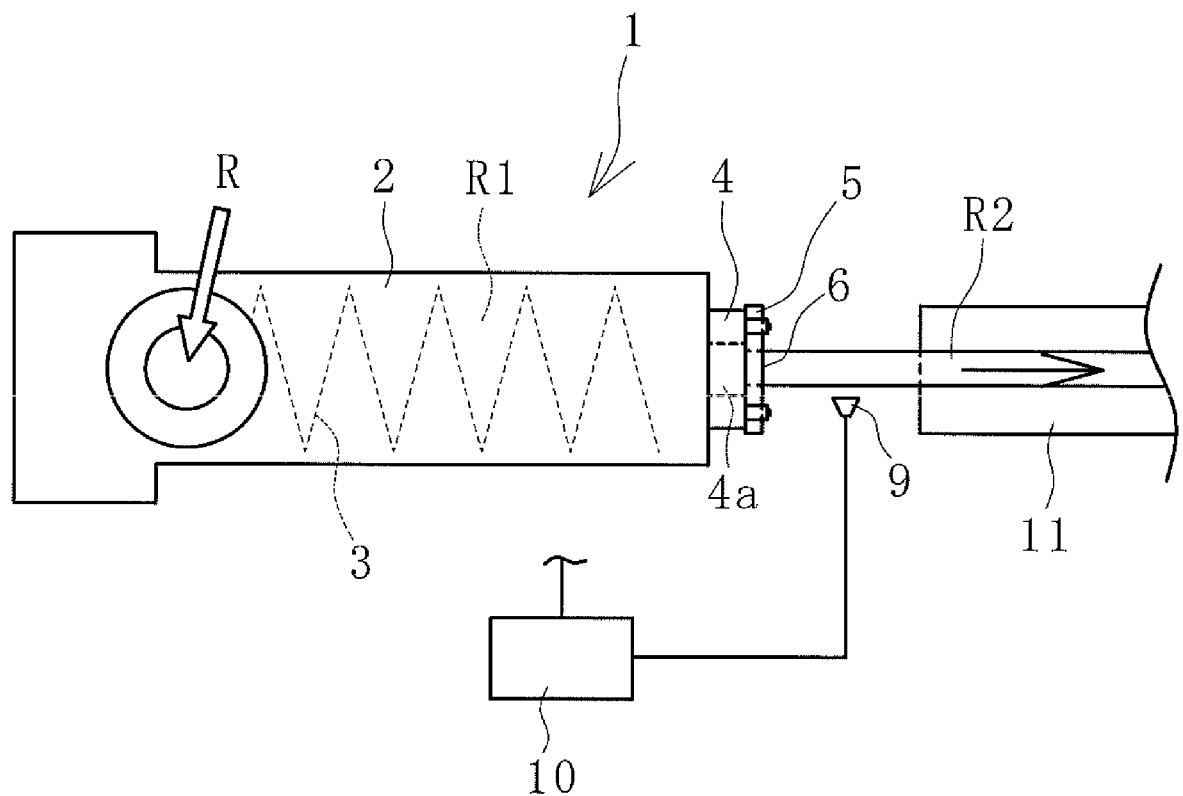
FIG. 1 is an explanatory diagram schematically illustrating a rubber extrusion device of an embodiment of the present technology in a plan view.

A rubber extrusion device and a method for manufacturing a rubber extrudate according to an embodiment of the present technology will be described below based on illustrated embodiments.

A rubber extrusion device 1 of an embodiment of the present technology illustrated in FIGS. 1 to 4 includes a cylindrical cylinder 2, a screw 3 disposed inside the cylinder 2, and a head 4 disposed at a leading end of the cylinder 2. A die 5 with an extrusion port 6 is attached to the head 4. The rubber extrusion device 1 includes a moving unit 7 that moves the die 5 at least in a uniaxial direction relative to the head 4 along a leading end surface of the head 4. Note that in FIG. 1, the moving unit 7 and the like are omitted and not illustrated.

In the embodiment, the rubber extrusion device 1 further includes a sensor 9 and a control unit 10 to which detection data from the sensor 9 is input. A conveyor device 11 is disposed in front of the die 5 to convey, to a next step, a rubber extrudate R2 extruded from the extrusion port 6.

In the drawings, the direction of arrow X and the direction of arrow Y are each illustrated as a uniaxial direction along the leading end surface of the head 4. The direction of arrow X is the lateral direction (width direction) of the head 4, and the direction of arrow Y is the vertical direction (height direction) of the head 4. The direction of arrow X and the direction of arrow Y are orthogonal to each other. It is sufficient that the uniaxial direction extends along the leading end surface of the head 4. Accordingly, the uniaxial direction is not limited to the direction of arrow X or the direction of arrow Y, and may extend obliquely along the leading end surface of the head 4.

Figure 4:
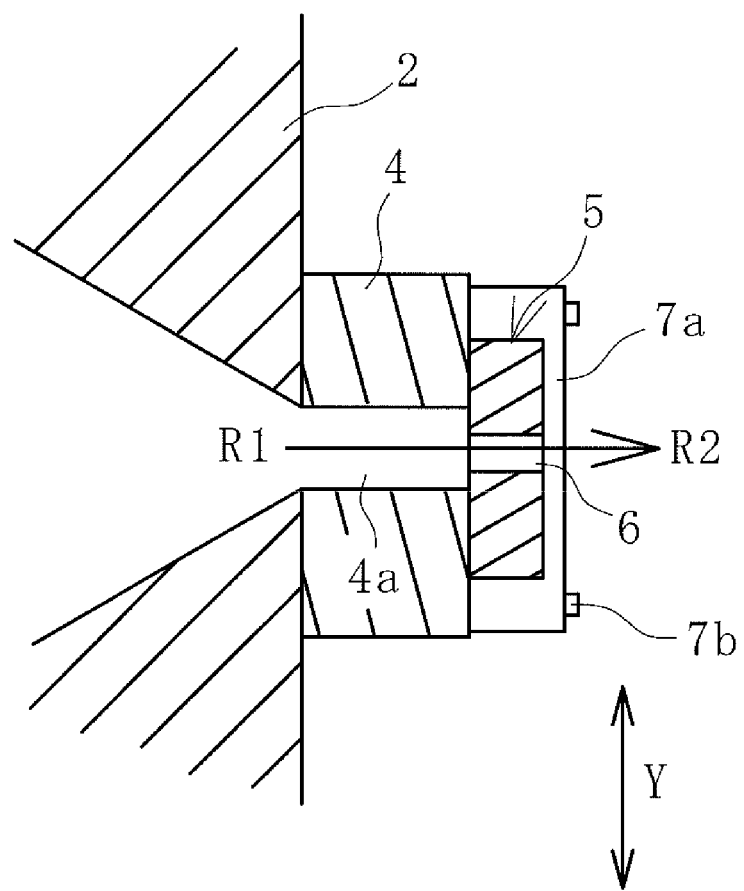
FIG. 4 is an explanatory diagram illustrating inside of the periphery of the head in a cross-sectional view taken along A-A of FIG. 2.

As illustrated in FIG. 4, at a leading end portion of the cylinder 2, an internal space is narrower toward the front. The head 4 includes an extrusion flow path 4a penetrating the head 4 in the longitudinal direction, and the extrusion flow path 4a is in communication with the internal space of the cylinder 2.

Figure 2:
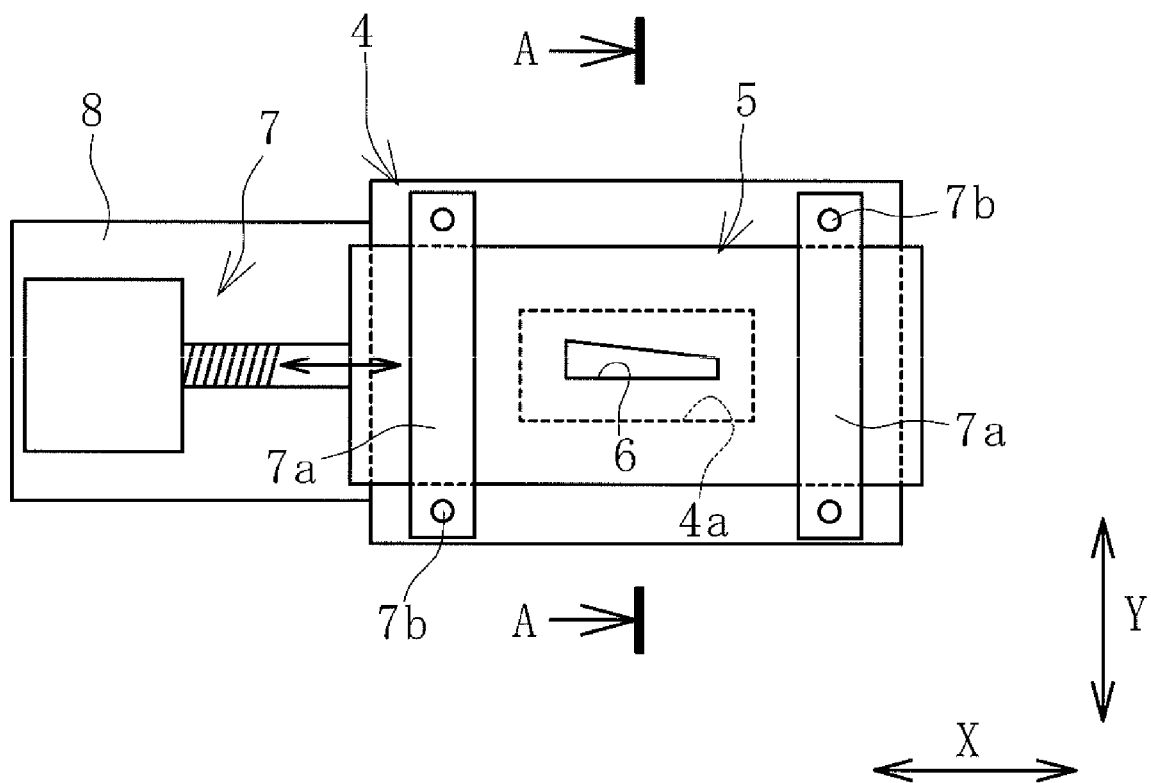
FIG. 2 is an explanatory diagram illustrating a periphery of a head of FIG. 1 in a front view.
Figure 3:
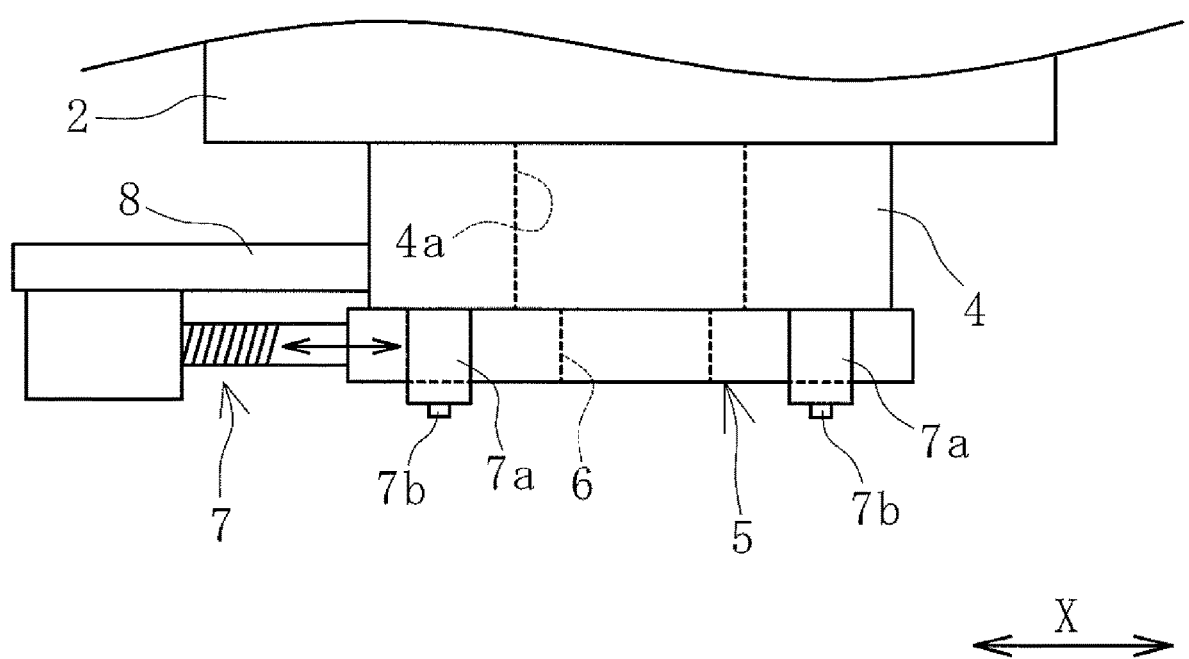
FIG. 3 is an explanatory diagram illustrating the periphery of the head of FIG. 1 in a plan view.

The die 5 is attached to a leading end position of the extrusion flow path 4a of the head 4. In the embodiment, the extrusion port 6 penetrating the die 5 in the longitudinal direction is shaped, in a front view, like a trapezoid extending in the lateral direction of the head 4 as illustrated in FIG. 2. The extrusion port 6 has a laterally asymmetrical shape. Since the extrusion flow path 4a and the extrusion port 6 are in communication, unvulcanized rubber R1 pushed through the internal space of the cylinder 2 into the extrusion flow path 4a is extruded to pass through the extrusion flow path 4a and exit through the extrusion port 6 as the rubber extrudate R2. The extrusion port 6 is not limited to this shape, and a desired shape such as a circle, an ellipse, a semicircle, a square, a rectangle, or the like is employed.

Two holding members 7a are fixed to the head 4 with a lateral spacing between the holding members 7a using fixing bolts 7b penetrating the respective holding members 7a in the longitudinal direction. The die 5 is held by the holding members 7a so as to be movable in the lateral direction with respect to the head 4.

A fixing plate 8 is mounted on a left side surface of the head 4 so as to protrude outward, and the moving unit 7 is installed on the fixing plate 8. In the embodiment, the moving unit 7 includes a servo motor and a ball screw rotated and moved in the axial direction by the servo motor, and a tip of the ball screw is connected to a left side surface of the die 5.

Besides, for example, a hydraulic cylinder or the like may be used as the moving unit 7. The installation location of the moving unit 7 is not limited to the left side of the head 4, and can be, for example, the right side of the head 4. Note that, instead of the structure in which the die 5 and the moving unit 7 are directly connected, a structure can be provided in which, for example, the moving unit 7 is connected to a frame body to which the dies 5 is attached.

Actuation of the moving unit 7 moves the ball screw back and forth in the lateral direction, and thus, the die 5 moves in the lateral direction with respect to the head 4. Correspondingly, in a front view, the position of the extrusion port 6 changes with respect to a leading end opening of the extrusion flow path 4a. The die 5 can be fixed at a desired moving position, and thus, the die 5 and the head 4 can be fixed at a desired relative position along the leading end surface of the head 4. The actuation of the moving unit 7 is controlled by the control unit 10 based on the detection data from the sensor 9. Thus, the die 5 is moved to and fixed at the desired position relative to the head 4 under the control of the control unit 10.

A procedure of a method for manufacturing a rubber extrudate according to an embodiment of the present technology will be described below.

In a case where the rubber extrudate R2 is manufactured by the rubber extrusion device 1, a predetermined amount of a rubber material R such as raw rubber and a compounding agent is fed into the internal space of the cylinder 2.

The rubber material R is mixed and kneaded by the rotating screw 3. The unvulcanized rubber R1 extruded forward by the screw 3 is softened to some degree (plasticized) and fed into the extrusion flow path 4a. The unvulcanized rubber R1 then passes through the extrusion flow path 4a.

The leading end opening area of the extrusion flow path 4a is partially covered by the die 5, and the unvulcanized rubber R1 is extruded from the extrusion port 6 with the desired shape. Thus, the rubber extrudate R2 provided with a desired cross-sectional shape is manufactured. For example, the rubber extrudate R2, such as a non-hollow, strip-like tire member provided with a predetermined shape, is manufactured according to an embodiment of the present technology. The rubber extrudate R2 is extruded while being conveyed to the next step by the transfer conveyor device 11.

Figure 5:
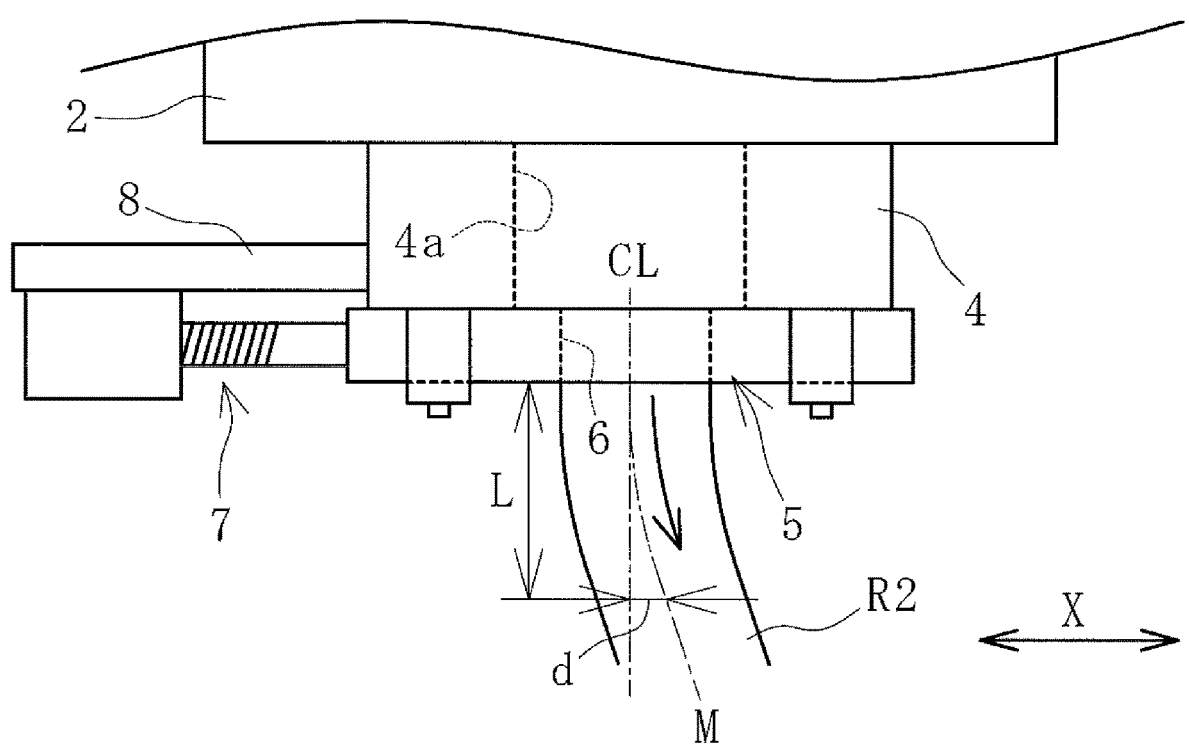
FIG. 5 is an explanatory diagram illustrating a state in which a rubber extrudate is extruded, with a die of FIG. 3 disposed in the center of the head in the lateral direction.

In a case where the unvulcanized rubber R1 varies in rubber physical properties or due to extrusion conditions or the like, the rubber extrudate R2 may be curved in an unintended direction (lateral direction or vertical direction) as illustrated in FIG. 5 even in a case where the rubber extrudate is extruded from the extrusion port 6 with the same shape. Note that, in FIGS. 5 to 7, the center position of the extrusion port 6 in the lateral direction (width direction) is indicated by a dot-dash line CL, and the center position of the rubber extrudate R2 in the lateral direction (width direction) is indicated by a dot-dash line M. In FIG. 5, at a position located at a forward distance L from the die 5, the lateral center position M of the rubber extrudate R2 is shifted rightward by an amount of shift d with respect to the reference position CL of the extrusion port 6, and the rubber extrudate R2 is curved rightward (by an amount of shift or curving d).

Curving of the rubber extrudate R2 in a specific direction as illustrated in FIG. 5 instead of straight extrusion is expected to be caused by a combination of various factors such as a variation in the rubber physical properties of the unvulcanized rubber R1, and extrusion conditions (pressure, temperature, flow velocity, and the like), matching between the cylinder 2 and the screw 3, and the like. The present inventors have found that the manner of curving (the amount or direction of curving) of the rubber extrudate R2 is changed by varying the relative position between the extrusion flow path 4a and the extrusion port 6 in a front view, and based on the findings, have created the present technology.

Figure 6:
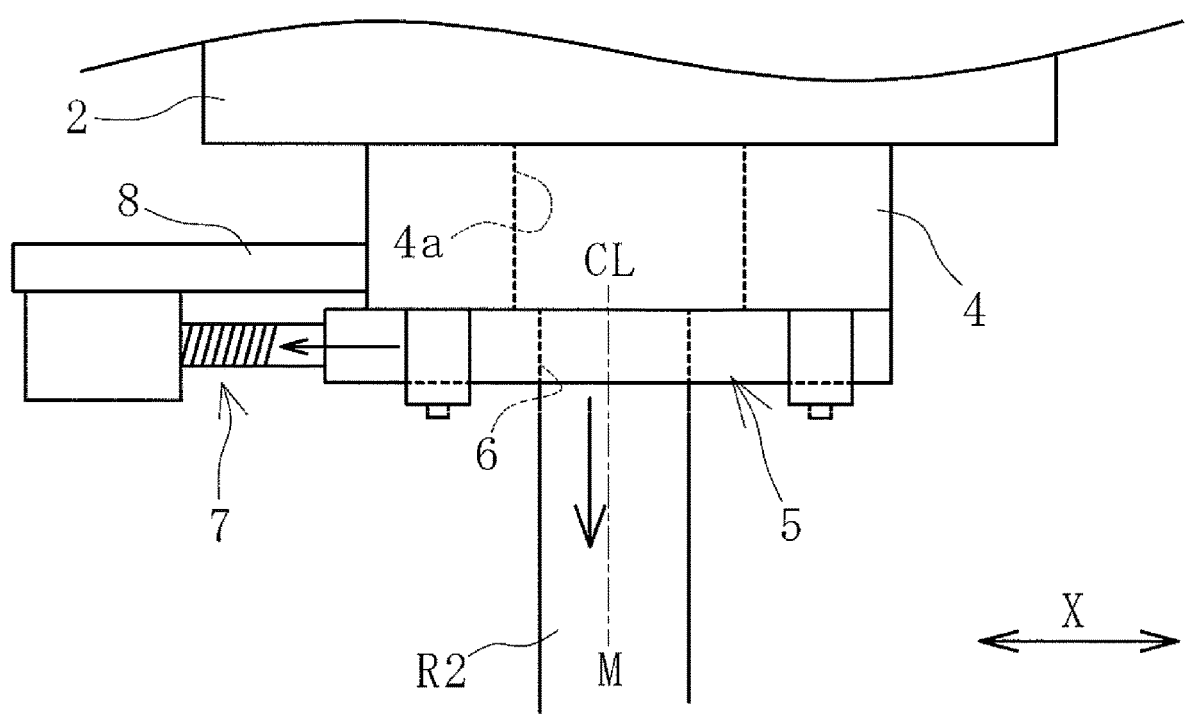
FIG. 6 is an explanatory diagram illustrating a state in which the rubber extrudate is extruded, with the die of FIG. 5 moved leftward with respect to the head.

Thus, in an embodiment of the present technology, the die 5 positioned as illustrated in FIG. 5 is moved leftward with respect to the head 4, as illustrated in FIG. 6. Such a change in the relative position between the extrusion flow path 4a and the die 5 in a front view changes a pressure distribution (fluid flow distribution) of the unvulcanized rubber R1 passing through the extrusion flow path 4a and then through the extrusion port 6. Correspondingly, a leftward curving force acts on the rubber extrudate R2 to allow the manner of curving of the rubber extrudate R2 to be adjusted.

Figure 7:
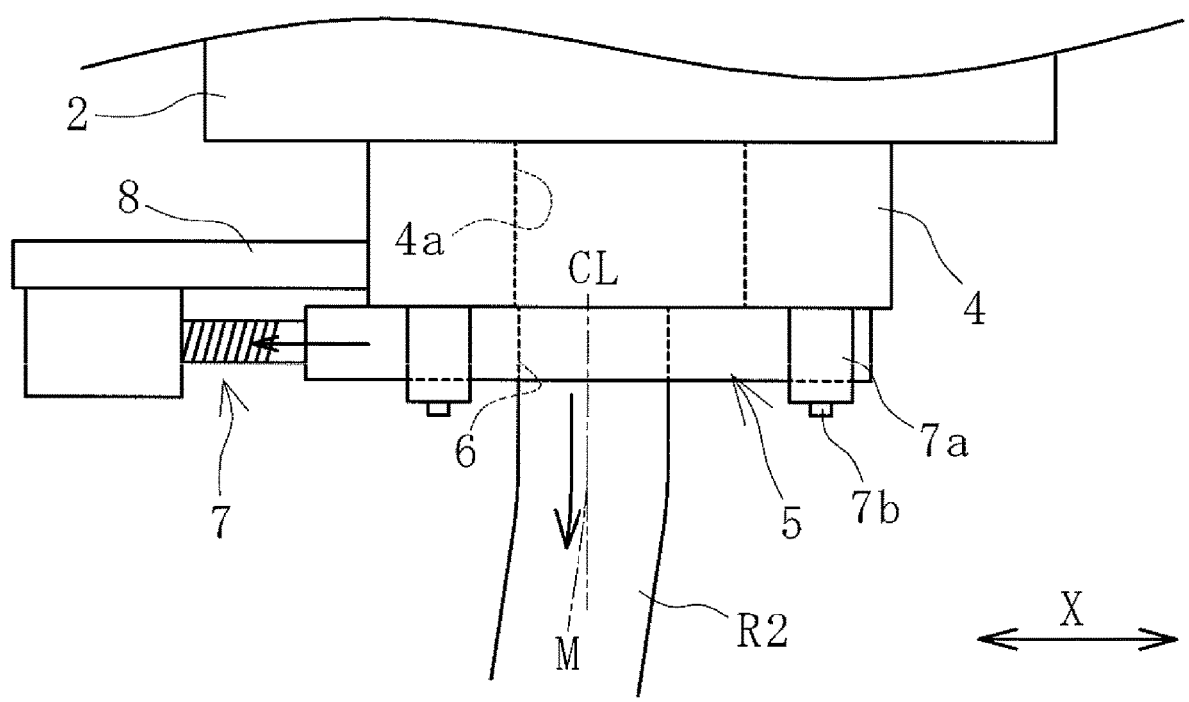
FIG. 7 is an explanatory diagram illustrating a state in which the rubber extrudate is extruded at a position where the die of FIG. 6 has been moved further leftward with respect to the head.

In a case where the die 5 is moved further leftward with respect to the head 4 as illustrated in FIG. 7, the leftward curving force acting on the rubber extrudate R2 becomes excessively strong, thus curving the rubber extrudate R2 leftward. Thus, in an embodiment of the present technology, the relative position between the extrusion flow path 4a and the extrusion port 6 in a front view is appropriately adjusted to establish a fixed state as illustrated in FIG. 6. Then, the rubber extrudate R2 is extruded. As described above, by moving the die 5 relative to the head 4 along the leading end surface of the head 4 such that the rubber extrudate R2 is curved in a direction opposite to the direction of unintended curving, the unintended curving of the rubber extrudate R2 can be suppressed. As a result, the curving of the rightward curved rubber extrudate R2 is corrected, enabling a rubber extrudate R2 provided with a desired straight shape corresponding to the shape of the extrusion port 6 to be obtained.

Thus, according to an embodiment of the present technology, even in a case where a variation attributed to rubber physical properties or extrusion conditions or the like occurs, the rubber extrudate R2 having a desired shape inhibited from being unintentionally curved can be stably manufactured by controlling the relative position between the die 5 and the head 4 along the leading end surface of the head 4. Additionally, an embodiment of the present technology eliminates or minimizes a need for excess work performed in the related art to modify the shape of the die 5 by machining or adjust the extrusion conditions or the like in each case of a variation attributed to the rubber physical properties or the extrusion conditions or the like. This is advantageous in improving the productivity of the rubber extrudate R2. Moreover, according to an embodiment of the present technology, it is only required that the moving unit 7 moving the die 5 is provided at the leading end position of the extrusion flow path 4a. Thus, an embodiment of the present technology can be easily applied to existing rubber extruders.

In the embodiment, the sensor 9 is used to successively detect the amount of lateral shift d of the lateral center position M of the rubber extrudate R2 relative to the lateral center position CL of the extrusion port 6 at a position located at the forward distance L from the die 5. The control unit 10 successively controls the position of the die 5 (the relative position between the die 5 and the head 4 along the leading end surface of the head 4) to make the amount of shift d closer to zero (the control unit 10 provides feedback control). The amount of shift d of the rubber extrudate R2 is largest at a position located at a distance L of approximately 500 mm, and thus, the sensor 9 detects the amount of shift d, for example, at a position located at a distance L of 400 mm to 600 mm.

In a case where there is some accumulation of correlation data between fluctuation parameters such as rubber physical properties and extrusion conditions and the relative position between the die 5 and the head 4 along the leading end surface of the head 4 and the manner of curving of the rubber extrudate R2 in a case of extrusion in the relative position, the correlation data is input into the control unit 10 in advance. In a case where extrusion of the rubber extrudate R2 is started, the rubber extrusion device is preset by inputting actual fluctuation parameters to the control unit 10 and based on these data and the correlation data described above, which has been input in advance, placing the die 5 at a predetermined position with respect to the head 4. Extrusion is then performed such that the rubber extrudate R2 has a desired shape prevented from being unintentionally curved.

In a case where the rubber extrudate R2 used, for example, as a tire component is manufactured using an embodiment of the present technology, the rubber extrudate R2 can have the desired shape inhibited from being unintentionally curved. Thus, manufacturing a tire using the rubber extrudate R2 is advantageous in improving the uniformity of the tire.

In a case where the uniaxial direction in which the die 5 is moved relative to the head 4 is set in the extension direction of the extrusion port 6 (the direction in which the extrusion port 6 extends the longest in a front view) as in the embodiment, a significant change is easily made to the pressure distribution (fluid flow distribution) of the unvulcanized rubber R1 passing through the extrusion flow path 4a and then through the extrusion port 6. Thus, the unintended curving of the rubber extrudate R2 is easily suppressed.

Figure 8:
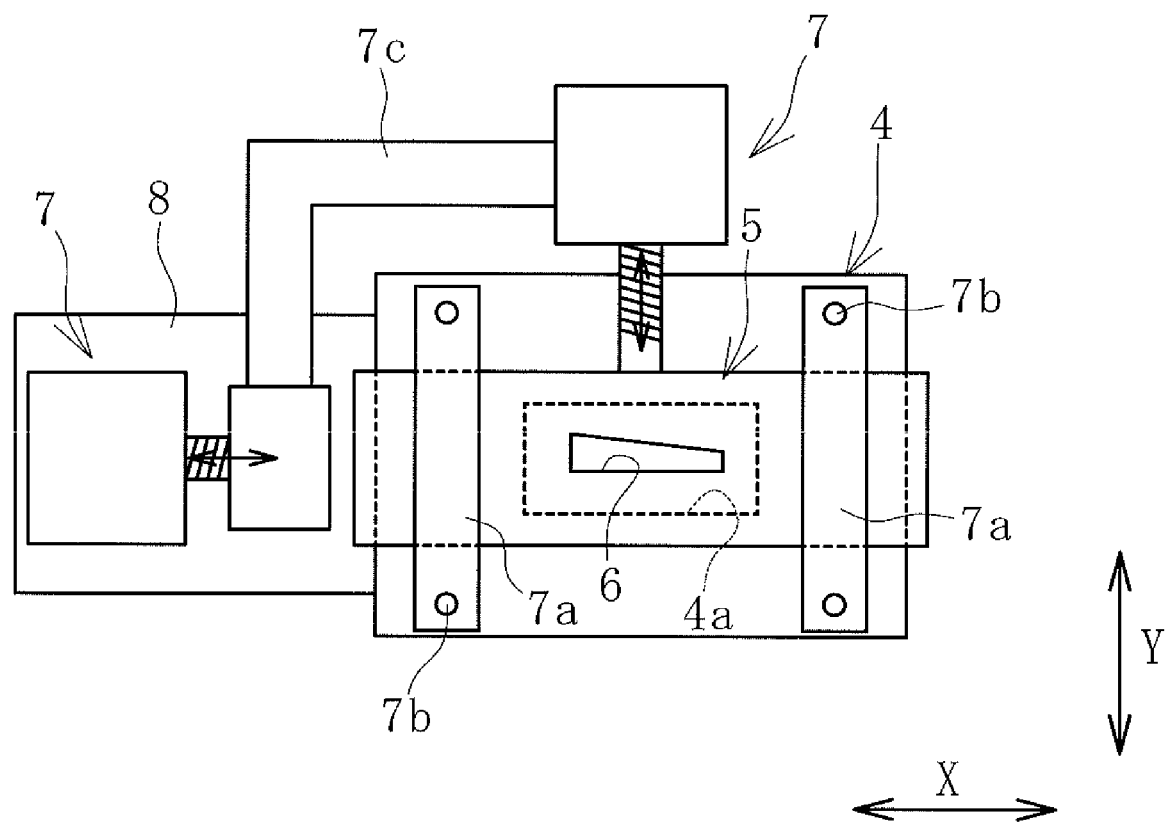
FIG. 8 is an explanatory diagram illustrating another embodiment of a rubber extrusion device in a front view.

In another embodiment of the rubber extrusion device 1 illustrated in FIG. 8, the die 5 is configured to be movable not only in the lateral direction but also in the vertical direction relative to the head 4 along the leading end surface of the head 4. Specifically, the moving unit 7 is disposed above the head 4. The moving unit 7 includes a servo motor and a ball screw rotated and moved in the axial direction by the servo motor, and a tip of the ball screw is connected to an upper surface of the die 5. The moving unit 7 is connected by a connecting arm 7c to another moving unit 7 disposed on the left side of the head 4. The die 5 is held by the holding member 7a so as to be movable in the lateral direction and the vertical direction with respect to the head 4.

The moving unit 7 disposed on the left side of the die 5 moves the die 5 and the moving unit 7 disposed above the die 5 via the connecting arm 7c, in the lateral direction with respect to the head 4 along the leading end surface of the head 4. Accordingly, in the embodiment, the die 5 is movable in a discretionary direction relative to the head 4 along the leading end surface of the head 4.

In the embodiment, further detailed changes can be made to the pressure distribution (fluid flow distribution) of the unvulcanized rubber R1 passing through the extrusion flow path 4a and then through the extrusion port 6. This allows the manner of curving of the rubber extrudate R2 to be more specifically adjusted. Thus, the unintended curving of the rubber extrudate R2 can be reliably suppressed with greater accuracy.

The various specifications described above in the embodiments can also be applied to the present embodiment.

The invention claimed is:

1. A rubber extrusion device, the rubber extrusion device comprising a cylindrical cylinder, a screw disposed in an internal space of the cylinder, a head installed at a leading end of the cylinder and including an extrusion flow path communicating with the internal space, and a die attached to the head at a leading end position of the extrusion flow path, the die including an extrusion port configured for extruding a non-hollow strip member, the rubber extrusion device comprising a moving unit configured to move the die during extrusion at least in a uniaxial direction relative to the head along a leading end surface of the head, the moving unit comprising a motor or a hydraulic cylinder and being capable of fixing the die and the head in a desired relative position, thereby an amount of curving of the non-hollow strip member with respect to an extrusion direction is reduced; and the rubber extrusion device comprises another moving unit configured to move the die during extrusion in a direction orthogonal to the uniaxial direction relative to the head along the leading end surface of the head, wherein the another moving unit is connected by a connecting arm to the moving unit and the moving unit moves the another moving unit via the connecting arm in the uniaxial direction with respect to the head along the leading end surface of the head.

2. The rubber extrusion device according to claim 1, wherein the uniaxial direction is set in an extension direction of the extrusion port.

3. The rubber extrusion device according to claim 2, further comprising a control unit moving the die and the head to a desired relative position by controlling operation of the moving unit.

4. The rubber extrusion device according to claim 3, wherein, based on detection data from a sensor, the control unit is configured to move the die and the head to the desired relative position.

5. The rubber extrusion device according to claim 1, further comprising a control unit moving the die and the head to a desired relative position by controlling operation of the moving unit.

6. The rubber extrusion device according to claim 5, wherein, based on the detection data from a sensor, the control unit is configured to move the die and the head to the desired relative position.

7. The rubber extrusion device according to claim 1, further comprising a plurality of holding members fixed to the head with a lateral spacing between the holding members, the holding members being configured to hold the die so as to be movable with respect to the head.

8. The rubber extrusion device according to claim 1, further comprising a fixing plate mounted to the head, the moving unit being installed on the fixing plate and connected to the die.

9. The rubber extrusion device according to claim 1, wherein the rubber extrusion device further comprises a sensor configured to detect the amount of the curving, with respect to an extrusion direction, of the non-hollow strip member extruded from the extrusion port at a distance in a direction of the extrusion flow path of from 400 mm to 600 mm from the die.

10. A method for manufacturing a rubber extrudate, the method comprising feeding a rubber material into an internal space of a cylindrical cylinder, extruding the rubber material forward using a screw disposed in the internal space, while mixing and kneading the rubber material, feeding resultant unvulcanized rubber into an extrusion flow path formed in a head located at a leading end of the cylinder, and extruding the unvulcanized rubber from an extrusion port as a rubber extrudate, the extrusion port being formed in a die attached to the head at a leading end of the extrusion flow path, the extrusion port being configured for extruding the rubber extrudate as a non-hollow strip member, the method comprising placing the die and the head in a desired relative position by moving the die by a moving unit comprising a motor or a hydraulic cylinder at least in a uniaxial direction relative to the head along a leading end surface of the head while extruding the unvulcanized rubber, and extruding the unvulcanized rubber such that the unvulcanized rubber passes through the extrusion flow path and exits though the extrusion port, reducing an amount of curving with respect to an extrusion direction of the rubber extrudate, wherein placing the die and the head in a desired relative position by moving the die by a moving unit further comprises moving the die by another moving unit during extrusion in a direction orthogonal to the uniaxial direction relative to the head along the leading end surface of the head, the another moving unit being connected by a connecting arm to the moving unit and the moving unit moves the another moving unit via the connecting arm in the uniaxial direction with respect to the head along the leading end surface of the head.

11. The method for manufacturing the rubber extrudate according to claim 10, further comprising detecting, using a sensor, the amount of the curving, with respect to an extrusion direction, of the non-hollow strip member extruded from the extrusion port at a distance in a direction of the extrusion flow path of from 400 mm to 600 mm from the die.

12. A rubber extrusion device, the rubber extrusion device comprising a cylindrical cylinder, a screw disposed in an internal space of the cylinder, a head installed at a leading end of the cylinder and including an extrusion flow path communicating with the internal space, and a die attached to the head at a leading end position of the extrusion flow path, the die including an extrusion port configured for extruding a non-hollow strip member, the rubber extrusion device comprising a moving unit configured to move the die during extrusion at least in a uniaxial direction relative to the head along a leading end surface of the head, the moving unit comprising a motor or a hydraulic cylinder and being capable of fixing the die and the head in a desired relative position, thereby an amount of curving of the non-hollow strip member with respect to an extrusion direction is reduced; wherein the rubber extrusion device further comprises a sensor configured to detect the amount of the curving, with respect to an extrusion direction, of the non-hollow strip member extruded from the extrusion port at a distance in a direction of the extrusion flow path of from 400 mm to 600 mm from the die;

the rubber extrusion device further comprises a control unit to which correlation data between fluctuation parameters including rubber physical properties of the non-hollow strip member and extrusion conditions and the relative position between the die and the head along the leading end surface of the head and the manner of curving of the non-hollow strip member in a case of extrusion in the relative position is input;

the control unit moves the die by controlling operation of the moving unit;

in a case where extrusion of the non-hollow strip member is started, the rubber extrusion device is preset by inputting actual data of the fluctuation parameters to the control unit and based on data of the fluctuation parameters which has been input and the correlation data, which has been input in advance in the control unit, the control unit places the die at a predetermined position with respect to the head and extrusion is then performed wherein the control unit is configured to move the die relative to the head based on the actual data and the correlation data such that the non-hollow strip member has a desired shape prevented from being unintentionally curved.

* * * * *